(12) United States Patent
Bruner et al.

(10) Patent No.: US 7,738,204 B2
(45) Date of Patent: Jun. 15, 2010

(54) DISK DRIVE WITH MULTI-PROTOCOL CHANNEL TO CONTROLLER INTERFACE AND METHOD

(76) Inventors: Curtis H. Bruner, 8374 Greenwood Dr., Longmont, CO (US) 80503; Larry J Koudele, 353 Shawnee La., Superior, CO (US) 80027; Noureddine Kermiche, 643 Teal Cir., Longmont, CO (US) 80503; James B French, Jr., 3609 Clover Creek La., Longmont, CO (US) 80503

( * ) Notice: Subject to any disclaimer, the term of this patent is extended or adjusted under 35 U.S.C. 154(b) by 286 days.

(21) Appl. No.: 11/507,752

(22) Filed: Aug. 22, 2006

(65) Prior Publication Data

US 2008/0049350 A1    Feb. 28, 2008

(51) Int. Cl.
*G11B 5/09* (2006.01)

(52) U.S. Cl. .............................. 360/51; 360/40; 360/41; 360/48; 360/53; 360/77.02; 710/74

(58) Field of Classification Search ........................ None
See application file for complete search history.

(56) References Cited

U.S. PATENT DOCUMENTS

| | | | | |
|---|---|---|---|---|
| 5,014,237 | A * | 5/1991 | Masters et al. | 710/74 |
| 5,594,600 | A * | 1/1997 | Bruner et al. | 360/69 |
| 5,809,338 | A * | 9/1998 | Klein | 710/35 |
| 6,104,565 | A * | 8/2000 | Bruner et al. | 360/69 |
| 6,178,056 | B1 * | 1/2001 | Cloke et al. | 360/46 |
| 6,178,057 | B1 * | 1/2001 | Kuroda et al. | 360/51 |
| 6,278,568 | B1 * | 8/2001 | Cloke et al. | 360/51 |
| 6,320,711 | B2 * | 11/2001 | Hill | 360/46 |
| 6,415,349 | B1 * | 7/2002 | Hull et al. | 711/100 |
| 6,580,573 | B1 * | 6/2003 | Hull et al. | 360/46 |
| 6,633,933 | B1 * | 10/2003 | Smith et al. | 710/74 |
| 6,678,109 | B2 * | 1/2004 | Kagami et al. | 360/77.08 |
| 6,924,953 | B2 * | 8/2005 | Fish et al. | 360/69 |
| 7,143,202 | B2 * | 11/2006 | Tehrani et al. | 710/15 |
| 7,165,139 | B2 * | 1/2007 | Bruner et al. | 711/112 |
| 7,214,089 | B1 * | 5/2007 | Learmonth et al. | 439/441 |
| 7,281,065 | B1 * | 10/2007 | Lam et al. | 710/33 |

(Continued)

OTHER PUBLICATIONS

PCTUS0776571, Oct. 3, 2008, Written Opinion of the International Searching Authority.
International Search Report from PCT/US07/76571 published Dec. 24, 2008.

*Primary Examiner*—Dismery E Mercedes
(74) *Attorney, Agent, or Firm*—Workman Nydegger (57) ABSTRACT

An apparatus and associated method are described for use in a disk drive including a disk that that is supported for controlled rotation and for cooperating with a transducer arrangement for accessing the disk in performing a data operation. The disk includes an arrangement of servo track wedge segments for storing servo data such that a set of servo data is periodically available as the disk is rotated in relation to the transducer arrangement and the servo track wedges are separated by an arrangement of user data wedge segments for use in storing user data. Generally, a controller IC and a channel IC are provided. The servo data is transferred from the channel IC to the controller IC using one data protocol and user data is bidirectionally transferred between the channel IC and the controller IC using a different data protocol.

19 Claims, 5 Drawing Sheets

U.S. PATENT DOCUMENTS

| | | | |
|---|---|---|---|
| 7,457,896 B1* | 11/2008 | Mount | 710/74 |
| 2002/0184424 A1* | 12/2002 | Benson et al. | 710/301 |
| 2003/0005188 A1* | 1/2003 | Tehrani et al. | 710/15 |
| 2003/0147165 A1* | 8/2003 | Damron et al. | 360/31 |
| 2006/0095693 A1* | 5/2006 | Aida et al. | 711/154 |
| 2006/0218437 A1* | 9/2006 | Kawa et al. | 714/6 |
| 2008/0005457 A1* | 1/2008 | Flake et al. | 711/112 |

\* cited by examiner

DISK DRIVE WITH MULTI-PROTOCOL CHANNEL TO CONTROLLER INTERFACE AND METHOD

BACKGROUND

The present invention is generally related to disk drives and, more particularly, to a transformable data interface that is used in a disk drive.

Modern disk drives, particularly, hard disk drives typically utilize what is referred to as an "embedded servo" format. A disk, in accordance with this system, includes wedge-shaped regions of servo data which separate regions in which user data can be stored during write operations and retrieved during read operations. These read and write operations are coordinated and controlled, based on the servo data, in a well-known, although complex manner. One approach in attempting to improve the handling of servo data versus user data is seen in U.S. Pat. No. 6,278,568 issued to Cloke et al. (hereinafter the '568 patent), as will be discussed immediately hereinafter.

A typical hard disk drive includes a channel IC that is configured for processing information as it is received from one or more disks within the drive, as read by a transducer arrangement, and for preparing information to be stored by the drive, using the transducer arrangement. It should be appreciated that the information retrieved by the transducer arrangement is essentially analog in form. The channel IC serves to convert both analog servo information, as well as user data that is read from the disk to digital form. In this regard the '568 patent illustrates such a channel IC in FIG. 1D, indicated by the reference number 26. Such a channel IC is often interchangeably referred to in the art as a read/write channel, read/write IC or, more simply as a channel. With regard to the type of processing that is performed by the channel IC, servo data is transferred unidirectionally from the disk to the channel IC and beyond, whereas user data is bidirectional. That is, read user data travels in the same direction as servo data from the transducer arrangement to the channel. Thus, processing of the read user data and the servo data can be shared by some components in the channel. Write user data, on the other hand, passes oppositely from the channel to the transducer arrangement. User data is generally handled in the form of NRZ data in a parallel format. In the example of the '568 patent, FIG. 1D, a channel bus 38 transfers this NRZ user data, i.e., both read user data and write user data, to and from a host interface and disk controller (HIDC) 32. It is noted that this arrangement is typical of the prior art for purposes of transferring user data between a channel IC and a controller IC. It is important to understand, however, that there is other information that is needed by the controller. In particular, the controller needs the servo information. This is complicated by the fact that the servo information is not in the NRZ parallel format that is required by channel bus 38. The typical approach of the prior art, with respect to transferring servo data, is to provide dedicated physical lines between the channel and controller in order to support transfer of the servo data. The '568 patent, in contrast, takes a different approach, as will be described immediately hereinafter.

With respect to transferring servo data from channel 26 to controller 32, the '568 patent describes its approach, for example, at col. 15, lns. 17-20. The patent converts the servo data to the format of the NRZ user data and then transfers the servo data on channel bus 38 to controller 32. While this approach does limit the number of physical connections between the channel and controller, it is submitted that the conversion process and subsequent data recovery is difficult at best. For example, the channel bus operates according to its own clocking signal and protocol whereas the servo data is essentially in the form of serial data that is provided in timed relation to its own serial clock and according to a serial data protocol. Further, the '568 patent describes the transfer of servo burst data at col. 10, lns. 2-8, via a microprocessor 120 on a microprocessor bus 36 that is separate from channel data bus 38. Thus, it appears that only part of the servo data is being transferred on channel bus 38, resulting in a complex process, at best. An approach that does not require such a difficult conversion process or complexity would be desirable.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An apparatus and associated method are described for use in a disk drive including a disk that that is supported for controlled rotation thereof and for cooperating with a transducer arrangement for accessing the disk in performing a data operation. The disk includes an arrangement of servo track wedge segments for storing servo data such that a set of servo data is periodically available as the disk is rotated in relation to the transducer arrangement and the servo track wedges are separated by an arrangement of user data wedge segments for use in storing user data.

Generally, a controller IC and a channel IC are provided. The servo data is transferred from the channel IC to the controller IC using one data protocol and user data is bidirectionally transferred between the channel IC and the controller IC using a different data protocol.

One embodiment involves, by way of example, a controller IC is provided including a controller port and a channel IC includes a channel port that is configured for communication with the controller port, at least for periodically recovering the set of servo data for use in coordinating the data operation based, at least in part, on the servo data to handle the user data in a predetermined way. An interface includes a first portion that forms part of the channel IC, a second portion that forms part of the controller IC, and an arrangement of electrical conductors that connects the controller port of the controller IC with the channel port of the channel IC. The servo data is transferred from the channel port to the controller port and the user data is transferred between the channel port and the controller port. The first portion and the second portion are configured to cooperate for transferring the servo data across the arrangement of electrical conductors according to a first data protocol and for transferring the user data across the arrangement of electrical conductors according to a second data protocol, which is different from the first data protocol.

In another exemplary embodiment, a channel IC includes a first section that is configured for processing the set of servo data as read from the disk for a control use. A second section is configured to cooperate with the first section for processing the user data, which can pass bidirectionally therethrough as user read data when being transferred from the disk and as user write data when being transferred to the disk. A channel port forms part of the channel IC and is configured for externally transferring the set of servo data according to a first data protocol during a first data interval using a set of electrical conductors that are externally interfaced and for bidirectionally externally interfacing said user data according to a second data protocol, that is different from said first data protocol, during a second data interval, in timed relation to said first interval, using said set of electrical conductors.

In still another exemplary embodiment, a controller IC is configured for cooperatively interacting with a channel IC. The controller IC includes a controller port that is configured for receiving the set of servo data from the channel IC according to a first data protocol and during a first time interval and for bidirectionally communicating the user data through the controller port according to a second data protocol that is different from the first data protocol and during a second time interval in timed isolation from the first interval. A servo section is configured for using the set of servo data received from the controller port to control the transducer arrangement in accessing the disk. A user data section is configured to cooperate with the servo section for processing the user data, which can pass bidirectionally therethrough as user read data from the controller port and as user write data to the controller port.

In addition to the exemplary aspects and embodiments described above, further aspects and embodiments will become apparent by reference to the drawings and by study of the following descriptions.

BRIEF DESCRIPTIONS OF THE DRAWINGS

Exemplary embodiments are illustrated in referenced figures of the drawings. It is intended that the embodiments and figures disclosed herein are to be illustrative rather than limiting.

DETAILED DESCRIPTION

Various modifications to the described embodiments will be readily apparent to those skilled in the art and the generic principles taught herein may be applied to other embodiments. Thus, the present invention is not intended to be limited to the embodiment shown but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology has been adopted for purposes of enhancing the reader's understanding, with respect to the various views provided in the figures, and is in no way intended as being limiting.

Figure 1:
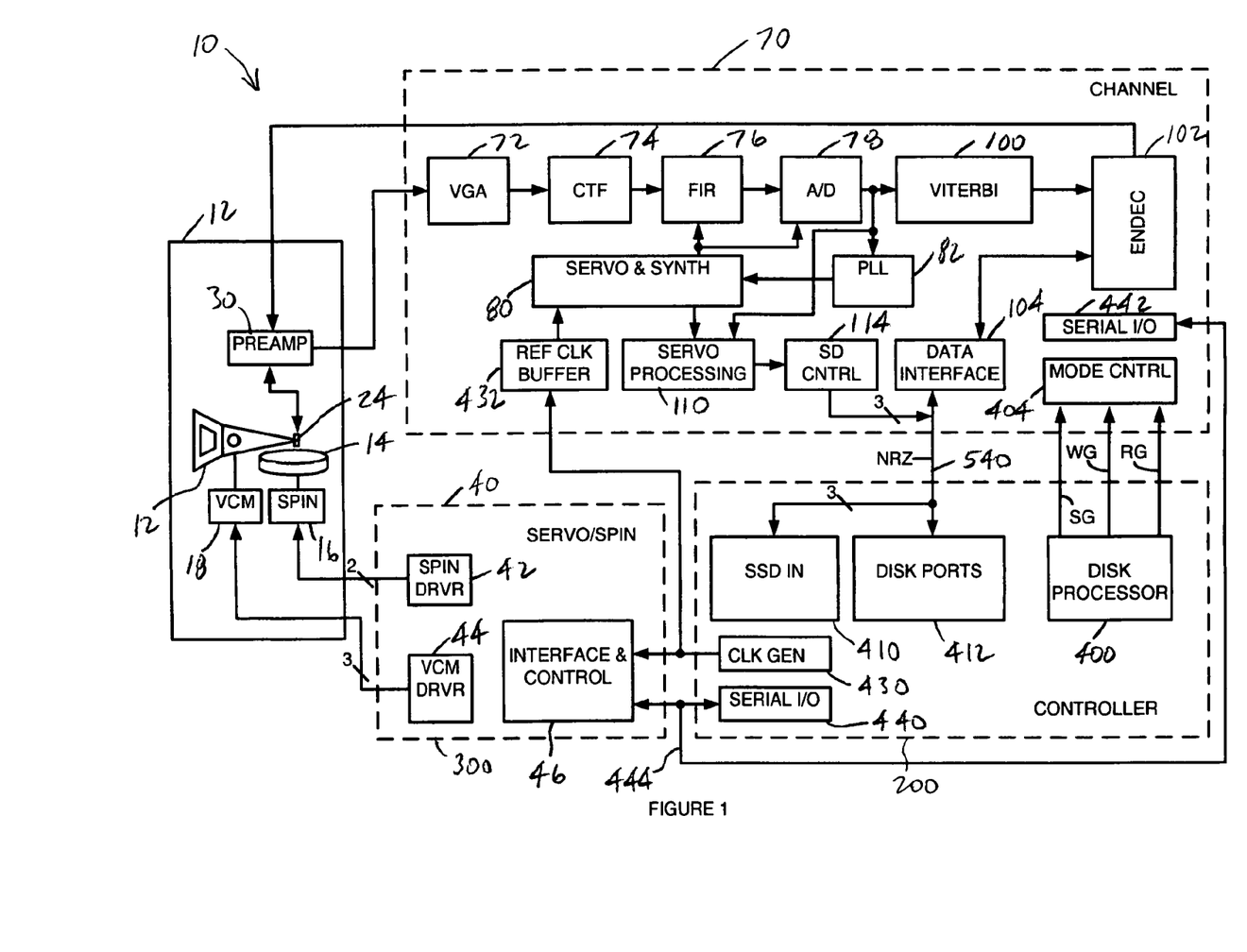
FIG. 1 is a block diagram illustrating one embodiment of a hard disk drive.

Turning now to the figures wherein like reference numbers are used to refer to like components whenever possible throughout the various figures, attention is immediately directed to FIG. 1 which illustrates a hard disk drive (HDD) that is generally indicated by the reference numeral 10. Disk drive 10 includes a head disk assembly 12 having a disk arrangement 14 that includes at least one disk that is supported for controlled rotation using a spin section 16. A VCM section 18 controls HGA 12 that is supported for pivotally moving a transducer arrangement 24 in controlled relation to any suitable number of disk surfaces in disk arrangement 14. A preamp section 30 is in bidirectional electrical communication with transducer arrangement 24. A servo/spin IC 40 provides control signals to spin section 16 and to VCM section 18 in a well-known manner using a spin driver section 42 and a VCM driver section 44, respectively. The servo/spin IC further includes an interface and control section 46 that provides external interfacing in a well-known way, receiving a clock signal from a system clock generator, or other suitable source, and a serial I/O communication interface, both of which are yet to be described.

Still referring to FIG. 1, drive 10 includes a channel IC 70 that handles data to and from transducer arrangement 14, via preamp 30. This data includes servo data, for use in positional control, and user data which may be involved in a write operation or a read operation. Servo data and user read data travel from preamp 30 on an analog data path which, in the present example, includes a variable gain amplifier (VGA) section 72, a continuous time filter (CTF) section 74, a finite impulse response equalizer (FIR) section 76 and is terminated by an analog to digital converter (A/D) section 78 which generates a digital signal based on either read data or servo data. Each of these sections is well-known in the art and, as such, will be briefly described. Further, any suitable componentry may be utilized in the analog path and the present application is not intended to be limited to the exemplary components shown here. As one example, a digital FIR section can be used, which would be on the output side of A/D converter 78 in FIG. 1.

During a read or servo data handling operation, preamp 30 receives information, in analog form, from transducer arrangement 24 and amplifies the information for receipt by VGA section 72. In this way, the latter can provide a signal to CTF 74 that is reasonably constant. CTF 74 generally serves to filter out noise in the manner of a low pass filter with programmable bandwidth and boost. The CTF presents a relatively sharp cut off frequency. FIR section 76 essentially appears as a form of a tapped delay line having a set of tap weights that are programmed by a servo and synthesizer section 80. It is noted that this latter section also controls analog to digital converter section 78 since both FIR section 76 and analog to digital converter section 78 are set to function differently for servo data than for read or user data. For example, the tap weights are changed in the FIR section while the analog to digital converter uses different sample rates. It is noted that the '568 patent, described above, provides details with respect to a digital FIR section with reference to FIG. 10 of the patent. Servo and synthesizer section 80, in its synthesizer function, includes a servo clock synthesizer portion and a data clock synthesizer section. The former produces a generally constant servo clock signal, while the later produces a data clock reference signal that changes at least on the basis of the relative radial position on the disk, as is known in the art. It should, therefore, be appreciated that the servo clock signal and the data clock reference signal can necessarily be of different frequencies. This requirement may change in future servo systems since a "zoned" servo arrangement may be used where the frequency of the servo signal changes based on radial position on the disk. Analog to digital converter 78 also provides its output to a digital phase locked loop (PLL) 82. The latter is used in a well known manner as part of a feedback control system for purposes of controlling the servo clock signal and the data clock reference signal. That is, the data clock reference signal is synchronized to the NRZ data that is coming in, for example, in a user read operation. It is noted that the data clock signal changes in frequency on the basis of radial position on the disk. The speed of the user data can change for other reasons such as, for example, if the disk speed changes slightly. Irrespective of the cause of the irregularity in frequency, this closed loop feedback system causes the data clock reference signal to remain locked to the incoming data. In effect, A/D converter 78 is caused to sample the incoming signal at the proper points on its waveform. This system responds similarly with respect to servo data with the exception that the closed loop control is directed to the servo clock signal. It is noted that there are methods in the prior art where the data is not locked to a PLL but is sampled and, thereafter, interpolation between these samples is performed, for purposes of recognizing equivalent data information.

Still referring to FIG. 1, once analog to digital converter 78 has provided digital data, the latter flows differently on the basis of whether it is servo data or user data that was derived in a read operation (i.e., user read data). In the present example, recovered user read data is processed by a Viterbi section 100, which carries the name of its inventor, is well known in the art and may be referred to interchangeably as a maximum likelihood detector. The latter functions by sampling the voltage on the waveform at its input and compares these samples with a set of rules. When the data does not conform to the rule set, the maximum likelihood detector corrects the data. It should be appreciated that there may be errors in the data for a number of reasons which include, but are not limited to noise and disk imperfections.

The recovered user read data output of maximum likelihood detector 100 is provided to an encoder/decoder (ENDEC) section 102. For purposes of processing user read data, the ENDEC is in its decoder mode. The incoming data is decoded to produce NRZ data which is provided to a data interface 104 and handled as will be further described below. It is noted that at least portions of the servo data may pass through maximum likelihood detector 100. For example, the grey code can pass through detector 100. This information then rejoins the remainder of the servo data for subsequent handling therewith.

Servo data, on the other hand, is provided from analog to digital converter 78 to a servo processing section 110 and is controlled by servo and synthesizer section 80 in a well known manner to generate a servo clock signal and servo data which are then available to a servo data control section 114. Thus, both user read data and servo data paths have reached data interface 104 and servo data control section 114, respectively, at which point this data must then be transferred to a controller IC 200, as will be further described below. User write data, on the other hand, is received from controller IC 200 by data interface 104 in NRZ format, or other suitable format, and is then transferred to ENDEC 102 with the latter being configured in its encoder mode. From data interface 104, the NRZ user write data is handled in a well known manner in the channel IC by being encoded by ENDEC 102 and then provided to preamp 30. The preamp then transfers the encoded information to transducer arrangement 24 for recording on disk arrangement 14.

Attention is now directed to further details with respect to FIG. 1. In particular, controller IC 200 includes a disk processor 400 that controls the described data flow operations using a number of connections that have not been illustrated for purposes of clarity, for example, by reading buffers and registers and acting on the basis of data stored therein. Processor 400 also generates servo gate (SG), read gate (RG) and write gate (WG) signals that are used for controlling the drive in a manner that will be familiar to one having ordinary skill in the art and as will be further described at one or more appropriate points below. These signals are provided to a mode control section 404 in channel IC 70 which will be described in further detail at one or more appropriate points below. Like servo data control section 104 in the channel IC, a serial servo data in (SSD IN) section 410 is connected to a subset of an overall arrangement of NRZ lines that connect channel IC 70 to controller IC 200. The full set of these NRZ lines, which may be referred to as an NRZ bus, is connected between data interface 104 in channel IC 70 and a disk ports section 412 in controller IC 400. Servo serial data in section 410 and disk ports section 412 serve as repositories for servo and user data, respectively, which can be acted on in any number of ways once received therein, for example, by disk processor 400 or for purposes of performing error correction. It should be appreciated that the servo data path is one-way from channel IC 70 to controller 200 and section 410 is therefore labeled as "SSD IN," whereas the user/NRZ data path between data interface 104 and disk ports section 412 is a two-way or bidirectional data path. Thus, user data passes through this latter path for both read operations and write operations, although in opposite directions.

A clock generator 430, which may be a crystal controlled oscillator in controller IC 200, provides a clock signal for use therein as well as for use by channel IC 70 via a reference clock buffer 432 and by servo/spin IC 40 via interface and control section 46. Disk processor 400 uses interface and control section 46 to coordinate the operation of spin driver section 42 and VCM driver section 44 via a first serial I/O section 440, forming part of the controller IC and a second serial I/O section 442, forming part of the channel IC, and all of which are connected by a serial I/O bus 444. It should be appreciated that this form of control arrangement is well known in the art, as related to the use of a channel IC, controller IC and spin/servo IC and can readily be adapted to modified forms of IC topologies and configurations.

Figure 2:
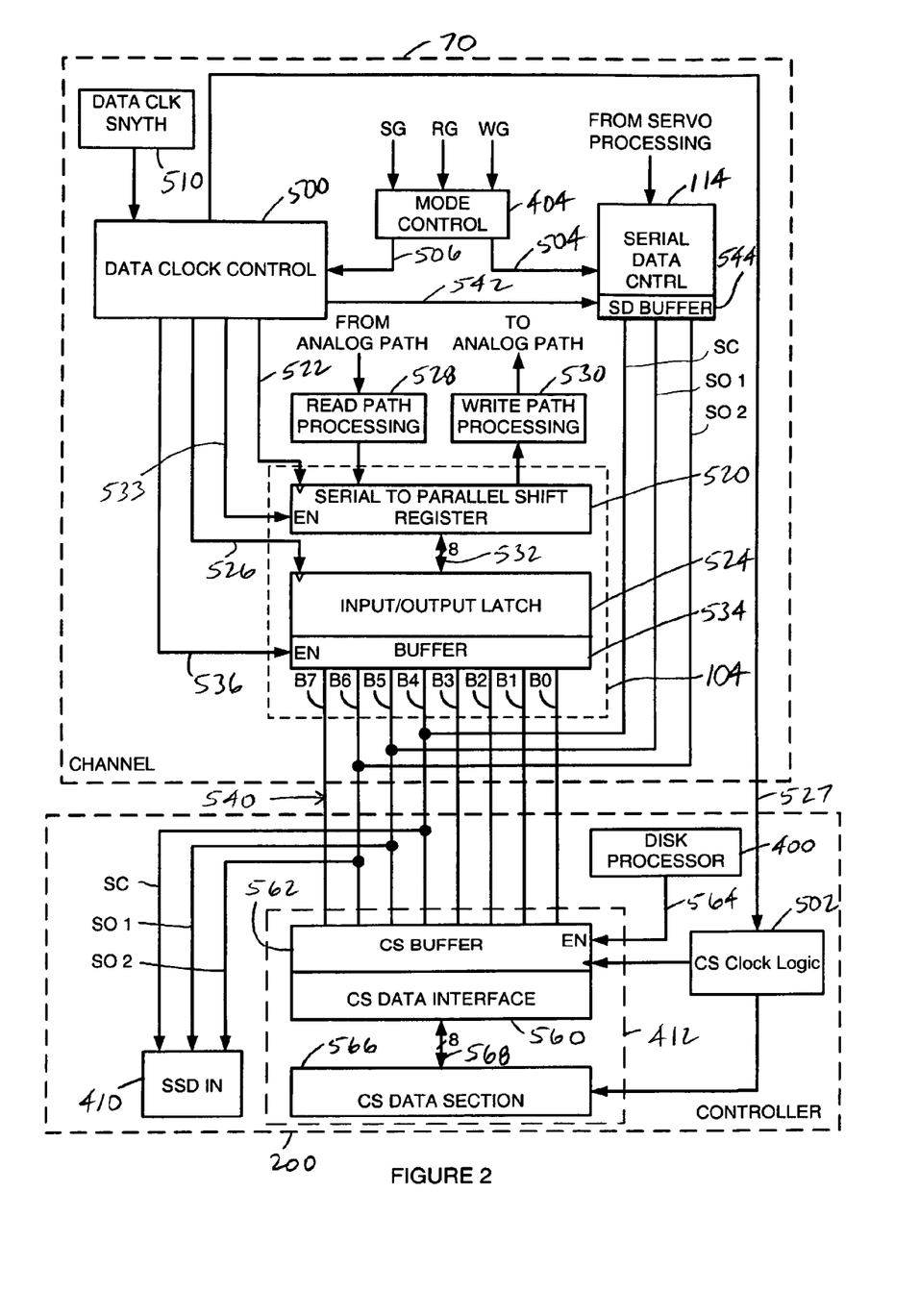
FIG. 2 is another block diagram illustrating further details with respect a portion of the hard disk drive of FIG. 1.

Referring to FIG. 2 in conjunction with FIG. 1, a more detailed illustration is provided with respect to portions of system 10 that relate to the transfer of servo data from channel 70 to controller 200 and the transfer of user data between channel 70 and controller 200. In particular, clocking and control logic is illustrated which includes a data clock control section 500 and a controller side (CS) clock logic section 502. Mode control section 404 receives read gate, write gate and servo gate to provide control signals based on these inputs which distinguish operation for purposes of retrieving and processing servo information from processing user data, that can be in the form of user read data or user write data. Accordingly, serial data control section 114 receives a servo mode signal 504 from mode control section 404 which indicates to the serial data control section that servo data is present and should be processed. Mode control section 404 also provides a data mode signal 506 to data clock control section 500 which indicates that NRZ/user data is to be processed. Such mode control signals generally serve to place these sections into an appropriate mode, based on the servo gate, SG, signal. That is, in the presence of SG, the serial data control section processes servo data in a servo data mode, while deassertion of SG causes the system to process user data in a user data processing mode. Read data can be processed during SG, due to read latency, as will be further discussed below. The type of user data that is to be processed is determined based on the Read Gate, RG, and Write Gate, WG, signals. It should be appreciated that most disk drives use these signals in a well known way that is consistent with there use herein. Further, these control signals or derivatives thereof are readily available in controller 200 since they are produced by disk processor 400, as described above with respect to FIG. 1.

Continuing to refer to FIGS. 1 and 2, data clock control section 500 receives a data reference clock from a data clock synthesizer 510 that forms part of servo and synthesizer section 80 of FIG. 1. This clock signal is phase locked to the user data using PLL 82 of FIG. 1. Thus, section 500 can provide NRZ based clocking signals, as needed. In particular, clock signals are provided to a serial to parallel shift register 520 on a line 522, to an input/output latch 524 on a line 526 and to CS Clock Logic section 502 on a line 527. It is noted that serial to parallel shift register 520 and input/output latch 524 form parts of data interface section 104 of FIG. 1, illustrated in FIG. 2 using a dashed rectangle. Serial to parallel shift register 520 receives information from a read path processing block 528. In the present example, read path processing block 528 includes Viterbi 100 and ENDEC 102 (see FIG. 1) which receive digital data from A/D converter 78 as the terminus of the analog path from preamp 30. On the other hand, serial to parallel shift register 520 can send user write information to a write path processing block 530 which is then passed to the analog path leading to preamp 30 and includes ENDEC 102 (see FIG. 1). Serial/Parallel shift register 520 includes a parallel interface 532, for example, eight bits wide, or some other chosen width, that connects to Input/Output latch 524 and which is enabled by data clock control section 500 via a line 533. The latter further includes a buffer section 534, that is tri-statable, connected to an eight bit NRZ bus 540, with individual conductors of the bus indicated as B0-B7 as these lines operationally pertain to their NRZ bus functionality between the channel and controller, such that the buffer section may terminate the NRZ lines with a high impedance or be placed into an enabled or active mode for reading from the NRZ lines or for driving data onto the NRZ lines. In this way, buffer section 534 is essentially disconnected from the NRZ lines in the tri-state mode such that these lines can be used for other purposes, yet to be described. When it is desired to use the NRZ lines for communication with controller 200, buffer 534 is placed into an active or enabled mode using a line 536 that is connected to an input that is designated as EN (Enable). In this active mode, buffer 534 can drive information onto the NRZ lines for transmission to controller 200 or receive information from controller 200. It is noted that all tri-state buffers described herein are functionally the same in providing for a tri-state high impedance mode and an active mode, via a control line. Similarly, serial data controller 114 includes an SD buffer 544 having a tri-state configuration so that a control line 542, from data clock control section 500, can select either the tri-state or active mode of operation. Buffer 544 is connected to a three line interface that is generally referred to as a serial servo data interface at least for the reason that the interface utilizes a serial data protocol. The lines which make up the serial servo data interface are labeled as they operationally pertain to serial data controller 544, as well as SSD IN section 410 in controller 200 and include a servo clock, SC line, a servo out (SO) 1 line and a servo out (SO) 2 line, as indicated, these lines also appear entering SSD IN section 410. It should be appreciated that SSD In section 410 does not require the use of a tri-state buffer for the reason that it only receives data. That is, the inputs to this section can be configured with a high impedance value.

As seen in FIG. 2, disk ports section 412 is diagrammatically illustrated by a dashed rectangle and includes a Controller Side (CS) Data Interface 560 having a tri-statable buffer section 562 that is connected to NRZ lines B0-B7, again as these lines pertain operationally to the NRZ bus. Buffer 562 can be selectively tri-stated using a buffer signal 564 that is originated from disk processor 400 and can readily be based on the servo gate, read gate and write gate signals that are generated by processor 400. CS Data Interface 560 provides for bidirectional flow of NRZ data between the NRZ bus and a CS Data Section 566 using an eight bit wide connection 568. Information that is stored in data section 566 can be processed, manipulated or moved in any suitable manner, for example, by disk processor 400 or by other portions of the drive such as for purposes of error correction.

Figure 3:
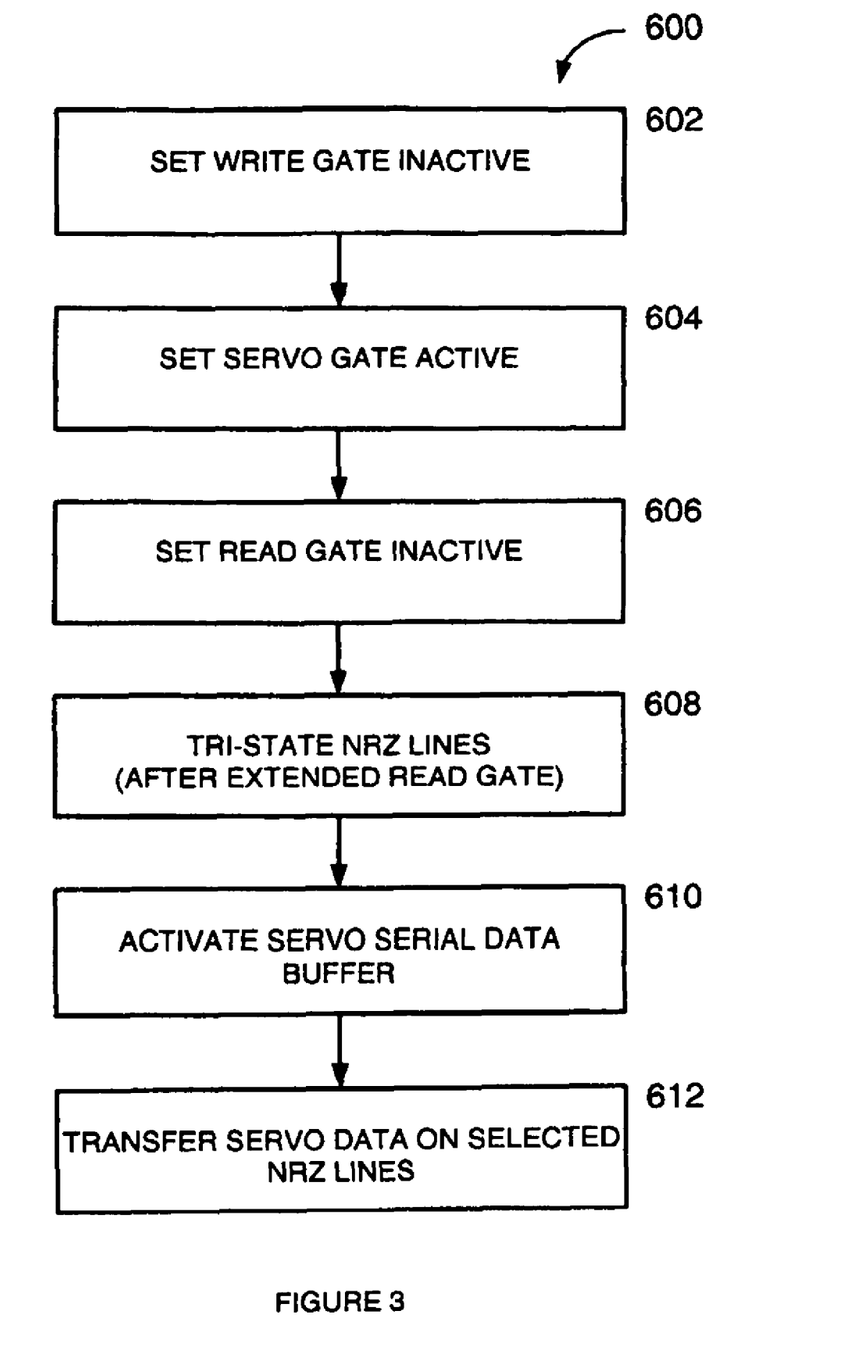
FIG. 3 is a flow diagram illustrating the initiation and transfer of servo data, using the hard disk drive of FIGS. 1 and 2.

Referring to FIGS. 1-3, details will now be provided with respect to the way in which user and servo data is communicated between channel 70 and controller 200. FIG. 3 is a flow diagram which illustrates one embodiment 600 for transferring servo data from channel 70 to controller 200. For purposes of this example, it may be assumed that a write operation has just concluded, although identical steps may be applied following a read operation. At 602, disk processor 400 sets write gate, WG, inactive. At 604, processor 400 sets servo gate active. This causes mode control section 404 to set serial data control section 114 (FIG. 2) into the servo data mode to prepare for receiving servo data and to cause data clock control section 500 to initiate clocking signals that are specific to the servo data mode. Read gate, RG, is set inactive at 606. In this regard, it should be appreciated that an extended read gate signal can be used which allows read data to flow from the analog path and read path processing 550 which includes Viterbi 100 and ENDEC 102 of FIG. 1, since the servo data is processed essentially independently of the user read data. Further details will be provided below with respect to extended read gate. At 608, Data Clock Control 500 and CS Clock Logic 502 cause buffers 534 and 562 at either end of NRZ bus lines to be tri-stated. It should be appreciated that the NRZ bus can remain tri-stated until a user data operation is initiated. That is, since there is a continuous need to process servo data, even in the absence of user data, it may be an expedient to tri-state the NRZ bus whenever no user data operations are occurring. Step 610 then activates or enables buffer 544 of serial data control section 114 such that the recovered servo clock, SC, can be driven onto the line so designated, as well as the B4 line which normally serves in the transfer of user data. SO 1 and SO 2 are likewise driven onto lines designated as such as well as B5 and B6, respectively, which normally serve in the transfer of user data. It should be appreciated that any arbitrary combination of lines can be selected on the user data bus, and there is no requirement to use B4-B6. At 612, servo data can then be transferred, as needed. In the present example, this servo data is considered to be serial servo data or can be any suitable protocol that is different than the user data bus protocol. The servo clock, SC, controls clocking of the data while SO 1 and SO 2 serve to transfer what originated as serial data from the disk. While one conductor can be used for purposes of transferring the serial servo data, a two conductor parallel interface, as illustrated, can be used for carrying data such that the frequency of the SC signal is one half what would be necessary if only one data line were used.

During transfer of the serial data, NRZ bus 540 is transformed so as to operate using a limited subset of the overall number of NRZ lines and under a protocol that is unrelated to the operation of these specific lines during the transfer of NRZ user data. In this regard, as mentioned above, clocking signals for the NRZ data versus those required for the serial servo data are completely different from one another. The servo clocking remains relatively fixed in today's typical systems, although this is not a requirement in the application of the teachings that have been brought to light herein, while the NRZ clocking frequency varies with radial position on the disk. Further, there is no need to convert the serial servo data, including SC, from its native form to conform to an NRZ protocol for transfer to controller 200. As discussed above, such data conversions can be quite complex, particularly with respect to clocking signals, and this conversion process requires additional logic and provides no particular value. With respect to this concern, two conversions are actually required as taught by the '568 patent. The first conversion, on the channel side, transforms the servo data from its native protocol to NRZ protocol, while a second data conversion, on the controller side, transforms the servo data from NRZ protocol back to its native protocol. Using the concept brought to light herein, a considerable degree of flexibility has been provided. That is, any suitable subset of the NRZ lines can be transformed for use in implementing a different protocol on a time division multiplexed basis, while essentially eliminating constraints that are imposed by data conversion processes.

Figure 4:
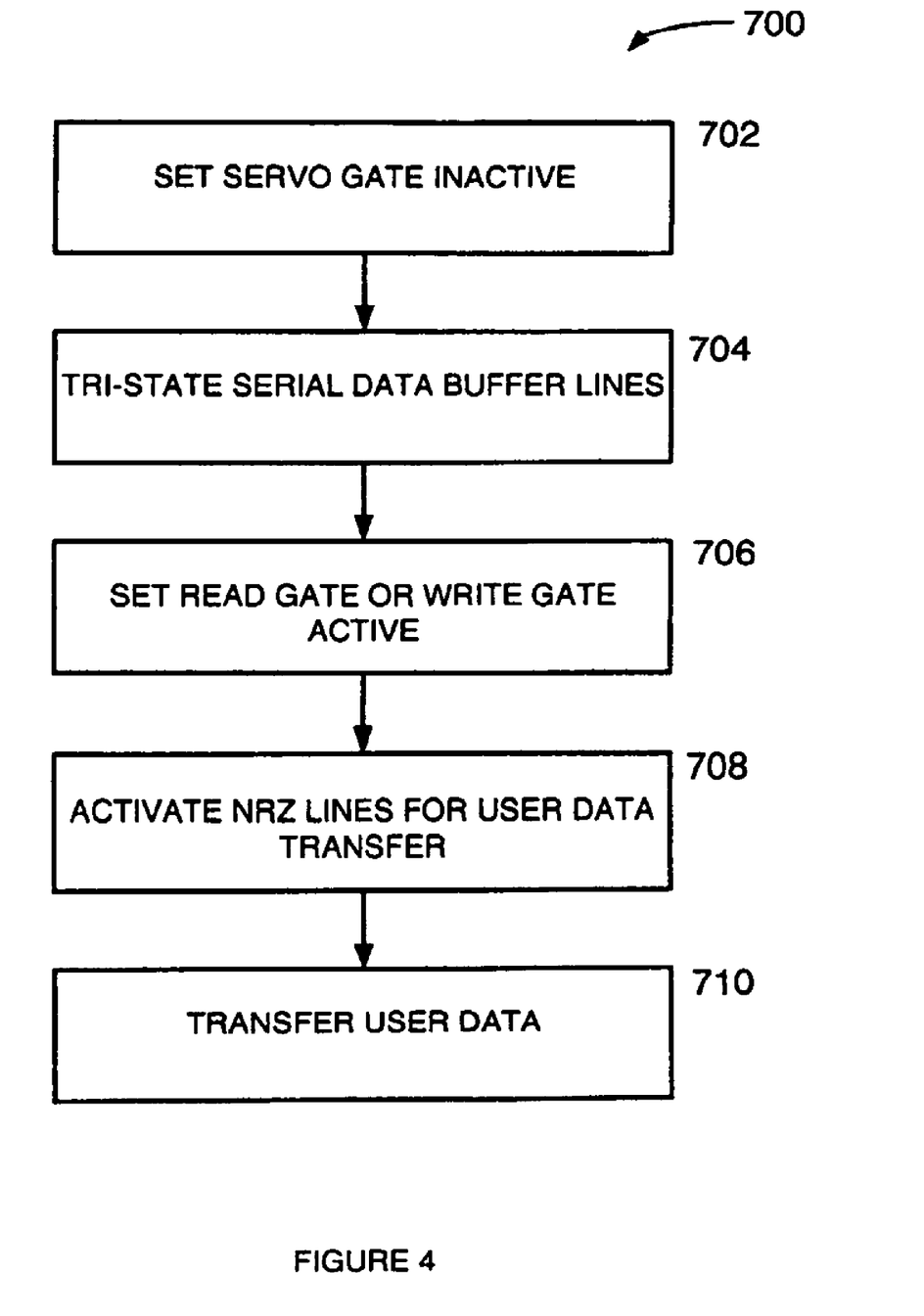
FIG. 4 is a flow diagram illustrating the initiation and transfer of read or write user data, using the hard disk drive of FIGS. 1 and 2.

Having described the transfer of servo data immediately above, attention is now directed to FIG. 4, in conjunction with FIGS. 1 and 2. The former is a flow diagram which illustrates one suitable embodiment, generally indicated by the reference number 700, for the transfer of user data between channel 70 and controller 200. For purposes of this example, it may be assumed that a servo data operation has just concluded. At 702, disk processor 400 sets servo gate, SG, inactive. At 704, data clock control section 500 tri-states serial data buffer 544 responsive to mode control section 404 and its inputs as generated by disk processor 400 (see FIG. 1). At 706, disk processor 400 sets read gate, RG, or write gate, WG, active. Responsive to either RG or WG, data clock control section 500, in 708, enables buffer 534 of input/output latch 524. In appropriate timed relation, disk processor 400 also enables CS buffer 562 of CS data interface 560 using line 564. At 710, user data can be transferred in either a user data read operation or a user data write operation. Optionally, at step 712, the NRZ lines can be tri-stated upon completion of the user data transfer. As mentioned above, the NRZ lines can be tri-stated awaiting a user data transaction, since there may be no need to transfer user data between servo bursts, that are associated with adjacent servo wedges, in the absence of a user data operation.

Figure 5:
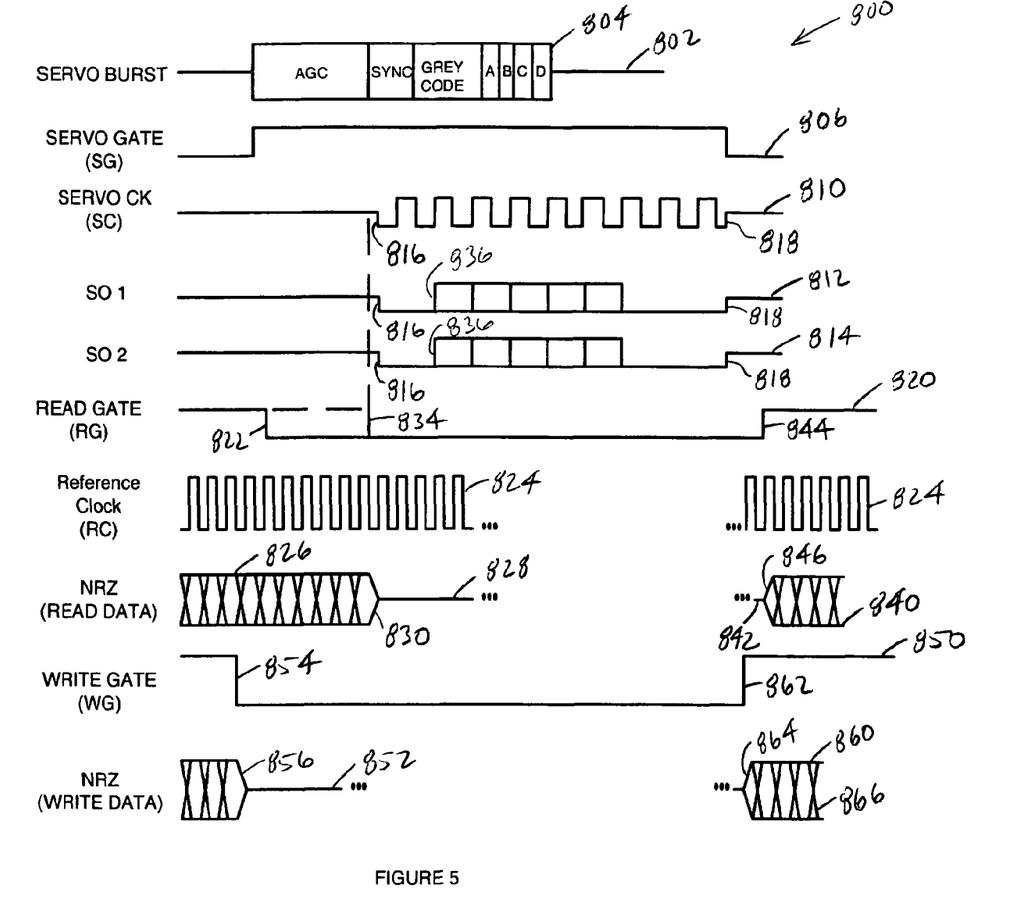
FIG. 5 is a timing diagram which illustrates the relationship between transfers of servo data, user read data and user write data.

While the foregoing descriptions are considered as providing an enabling disclosure, FIG. 5 provides a timing diagram, generally indicated by the reference number 800, which graphically further illustrates the concepts that have been described above with respect to operation of drive 10 and in view of FIGS. 1 and 2. Timing diagram 800 includes a servo burst trace 802 which illustrates a typical servo burst 804 including an AGC field, that is used to adjust gains, followed by a Sync or servo address mark. The latter is followed by a grey code which typically indicates track address, but can include more information. After the grey code, bursts A, B, C and D occur which are used in a well known manner for track following purposes. It should be appreciated, for purposes of control waveforms in FIG. 5, that active high signals have been illustrated. In this regard, active low signals can be used or any suitable mixture of active high and active low signals can be used. A servo gate (SG) trace 806 is illustrated, as produced by disk processor 400 of FIGS. 1 and 2. The servo gate signal can go active just before burst 804. A servo clock (SC) trace 810 is illustrated, which represents the recovered servo clock, based on the servo burst and generally produced through the cooperation of servo and synthesizer section 80 and servo processing section 110 of FIG. 1. Information transmission by serial servo output data lines SO 1 and SO 2 is represented by traces 812 and 814, respectively, in FIG. 5. A down-step 816 in each of these servo-related traces indicates the point at which control line 542 (FIG. 2) caused buffer 544 to change from a tri-stated mode to an enabled mode. Conversely, after processing the servo data, the servo data related lines are again tri-stated, as indicated by an up-step 818 in each of traces 810, 812 and 814.

Still referring to FIGS. 1, 2 and 5, a read gate signal trace 820 is illustrated, assuming that a user read operation, for an initial portion of the trace, is underway and approaching completion. Accordingly, read gate signal 820 goes inactive at 822. Transfer of the user read data is synchronized by reference clock RC, as represented by a reference clock trace 824. As seen in the servo data related traces 810, 812 and 814, buffer 544 of serial data controller 114 (FIG. 2) is tri-stated as NRZ user data is transferred in a first data transfer 826 of a first user read data trace 828. At 830, input/output latch buffer 534 and CS buffer 562 are tri-stated, in preparation for processing data relating to servo burst 804, as described above. Read gate trace 820 illustrates an extended internal read gate signal 834, that is represented by dashed lines, which provides for propagation of user read data through the analog path and associated components ahead of the servo data that is to follow. Thus, NRZ user data in first data transfer 826 is transferred almost up to enabling 816 of the servo clock line in trace 810 and the serial servo data lines in traces 812 and 814. Servo data starts at 836 in traces SO1 and SO2. The use of an extended internal read gate configuration provides for the use of additional space on the disk which would otherwise be unusable, due to constraints imposed by propagation delays.

A second data transfer 840 is illustrated using a second user read data trace 842. This second user data transfer occurs subsequent to read gate trace 820 becoming active at 844, while servo related traces 810, 812 and 814 are tri-stated. At 846, buffer 534 of input/output latch 524 and CS buffer 562 are transitioned from a tri-state mode to an enabled or active mode. NRZ user read data is then transferred.

FIG. 5 further illustrates a user write data operation wherein a write gate trace 850 is initially active as a first user data write data operation 852 approaches completion. Responsive to completion of the first user data write operation, write gate trace 850 goes inactive at 854 which causes buffer 534 of input/output latch 524 (FIG. 2) and CS buffer 562 to transition from active mode to the tri-state mode at 856. In this regard, write gate does not extend beyond servo gate. A second user data write operation 860 is initiated responsive to write gate trace 850 going active at 862, while servo related traces 810, 812 and 814 are tri-stated. It should be appreciated that the read and write operations that are illustrated by FIG. 5 are not occurring simultaneously, but are each illustrated in timed relation to servo data related events. At 864, buffer 534 of input/output latch 524 and CS buffer 562 are transitioned from the tri-state mode to the enabled or active mode. NRZ user write data 866 is then transferred.

Unlike prior art solutions such are exemplified by the '568 patent, as discussed above, the configuration and method described herein provide for the transfer of servo data and user data in accordance with different protocols. In this way, data can be advantageously transferred in its native protocol with no need for translation or conversion into a different protocol and then re-conversion back to its native protocol. In order to accomplish these advantages, the interface between the channel and controller is transformed to operate in accordance with two or more different protocols at different times, as needed. Thus, each protocol can utilize its own clocking signals and combinations of data lines.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An apparatus comprising:
    a disk including servo data and user data, the disk supported for controlled rotation;
    a transducer configured to read the servo data and the user data from the disk when the disk is rotating;
    a channel IC in communication with the transducer, the channel IC including a mode control portion and a channel port;
    a controller IC; and
    an interface including (i) a first portion that forms part of the controller IC, the first portion including a controller port in communication with the channel port, (ii) a second portion that forms part of the channel IC, and (iii) a set of electrical conductors that connects the controller port with the channel port, the interface configured to transfer the servo data from the channel port to the controller port according to a first data protocol and to transfer the user data between the channel port and the controller port according to a second data protocol, the second data protocol different from the first data protocol, the mode control portion controlling the mutually exclusive transfer of the user data and the servo data over the set of electrical conductors, at least a portion of the servo data and at least a portion of the user data transferred over at least one conductor of the set of electrical conductors.

2. The apparatus of claim 1 wherein the first portion and the second portion are configured to use a first subset of the set of electrical conductors and to not use a second subset of the set of the electrical conductors when executing the first data protocol and to use both the first subset and the second subset when executing the second data protocol.

3. The apparatus of claim 2, further comprising two tri-state buffers, wherein each of the tri-state buffers is electrically connected to at least the first subset of the set of conductors for selectively, alternatively tri-stating at least the first subset of the electrical conductors to transfer the servo data in the first data protocol and to transfer the user data in the second data protocol.

4. The apparatus of claim 3 wherein at least one of the tri-state buffers is configured to tri-state both the first subset and the second subset of the conductors at the channel IC.

5. The apparatus of claim 3 wherein the controller IC includes an additional tri-state buffer that is connected at least to the first subset of the electrical conductors, the additional tri-state buffer configured to cooperate with the two tri-state buffers to transfer the user data between the controller IC and the channel IC with the additional tri-state buffer in an enabled mode and to transfer the servo data from the channel IC to the controller IC with the additional tri-state buffer in a tri-state mode.

6. The apparatus of claim 1, wherein said first portion of the interface includes an arrangement of two tri-state buffers that are selectable by the mode control in a mutually exclusive way for transferring a selected one of the user data and the servo data.

7. The apparatus of claim 1 wherein the first data protocol is a serial data protocol.

8. The apparatus of claim 7 wherein the second data protocol is an NRZ protocol.

9. The apparatus of claim 1 wherein the interface is configured to use the first data protocol to transfer the servo data using a first clock signal and to transfer user data based on a second, different clock signal using the second data protocol.

10. A method comprising:
    providing a disk including servo data and user data;
    providing a controller IC including a controller port;
    providing a channel IC including a channel port and a mode control, the channel port configured to communicate with the controller port to at least periodically recover the servo data to use in coordinating the data operation;;
    providing an interface including (i) a first portion that forms part of the controller IC, the first portion including the controller port, (ii) a second portion that forms part of the channel IC, the second portion including the channel port and two tri-state buffers selectable by the mode control in a mutually exclusive way to transfer a selected one of user data and servo data and (iii) a set of electrical conductors that connects the controller port to the channel port; and
    configuring the interface to transfer the servo data from the channel port to the controller port according to a first data protocol and to transfer the user data between the channel port and the controller port according to a second data protocol, the second data protocol different from the first data protocol, the mode control controlling the transfer of at least one of the user data and the servo data over the set of electrical conductors.

11. The method of claim 10 further comprising a step of configuring the interface to use a first subset of the set of electrical conductors and to not use a second subset of the set of the electrical conductors when executing the first data protocol and to use both the first subset and the second subset when executing the second data protocol.

12. The method of claim 10 further comprising the step of electrically connecting each of the tri-state buffers to at least the first subset of the set of conductors to selectively, alternatively tri-state at least the first subset of the electrical conductors to transfer the servo data in the first data protocol and to transfer the user data in the second data protocol.

13. The method of claim 12 further comprising the step of configuring one of the tri-state buffers for tri-stating the first subset and the second subset of the conductors at the channel IC.

14. The method of claim 10 farther comprising the steps of
    configuring the controller IC to comprise an additional tri-state buffer; and
    connecting the additional tri-state buffer to at least the first subset of the electrical conductors, the additional tri-state buffer configured to cooperate with the two tri-state buffers in the channel IC to transfer the user data between the controller IC and the channel IC with the additional tri-state buffer in an enabled mode and to transfer the servo data from the channel IC to the controller IC with the additional tri-state buffer in a tri-state mode.

15. The method of claim 10 wherein the first data protocol is a serial data protocol.

16. The method of claim 15 wherein the second data protocol is an NRZ protocol.

17. The method of claim 10 including configuring the interface to use the first data protocol to transfer the servo data using a first clock signal and to transfer user data based on a second, different clock signal using the second data protocol.

18. A channel IC comprising:
- a first section configured to process a set of servo data from a disk including user data and the servo data;
- a second section configured to cooperate with the first section to process the user data, which can pass bidirectionally therethrough as user read data when being transferred from the disk and as user write data when being transferred to the disk;
- a mode control portion configured to enable the transfer of at least one of the user data and servo data;
- at least two tri-state buffers that are selectable in a mutually exclusive way to transfer a selected one of user data and servo data; and
- a channel port configured to transmit servo data according to a first data protocol during a first data interval to transmit and receive, during a second data interval, the user data according to a second data protocol, the second data protocol different from the first data protocol, the channel port configured to transmit at least one of a portion of the servo data or a portion of the user data out a single set of electrical conductors.

19. The channel IC of claim 18 wherein the channel port is configured to use, when executing the first data protocol, a first subset of the electrical contacts not a second subset of the electrical contacts, and, when executing a second data protocol, to use both the first subset and the second subset.

* * * * *